United States Patent
Goedert et al.

(10) Patent No.: US 10,377,266 B2
(45) Date of Patent: Aug. 13, 2019

(54) WEIGHT-RESPONSIVE VEHICLE SEAT OCCUPANT DETECTION AND CLASSIFICATION METHOD AND SYSTEM

(71) Applicant: IEE International Electronics & Engineering S.A., Echternach (LU)

(72) Inventors: Guenter Goedert, Trier (DE); Dietmar Jungen, Mehren (DE); Jorg Beck, Bernkastel-Kues (DE); Gianluca Favalli, Hautcharage (LU)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 15/553,900

(22) PCT Filed: Feb. 23, 2016

(86) PCT No.: PCT/EP2016/053758
§ 371 (c)(1),
(2) Date: Aug. 25, 2017

(87) PCT Pub. No.: WO2016/135135
PCT Pub. Date: Sep. 1, 2016

(65) Prior Publication Data
US 2018/0244172 A1      Aug. 30, 2018

(30) Foreign Application Priority Data

Feb. 27, 2015 (LU) .......................................... 92671

(51) Int. Cl.
*B60N 2/70* (2006.01)
*B60N 2/00* (2006.01)
(Continued)

(52) U.S. Cl.
CPC ............... *B60N 2/002* (2013.01); *B60N 2/70* (2013.01); *B60N 2/7094* (2013.01);
(Continued)

(58) Field of Classification Search
CPC .... B60N 2/002; G01G 21/28; G01G 19/4142; B60R 2022/4858; B60R 22/48; B60R 21/01556; B60R 21/01516
See application file for complete search history.

(56) References Cited

U.S. PATENT DOCUMENTS 5,987,370 A    11/1999  Murphy et al.
6,431,593 B1 *  8/2002  Cooper ................. B60R 21/013
                                                        180/273
(Continued)

FOREIGN PATENT DOCUMENTS

EP          2727497 A1      5/2014
JP         H0864056 A       3/1996
WO     WO2014017563 A1      1/2014

OTHER PUBLICATIONS

International Search Report for International application No. PCT/EP2016/053758, dated May 19, 2016, 4 pages.
(Continued)

*Primary Examiner* — Lisa M Caputo
*Assistant Examiner* — Brandi N Hopkins
(74) *Attorney, Agent, or Firm* — Reising Ethington P.C.

(57) ABSTRACT

A vehicle seat occupant classification system for use in a vehicle seat includes a weight-responsive sensor, at least one bracket member serving as a holder for the weight-responsive sensor, and an evaluation unit configured to evaluate a status of the at least one weight-responsive sensor. The bracket member is fixedly attached to the seat base. If a mechanical load at least corresponding to a first pre-determined threshold value is applied by a seat occupant, a portion of the vehicle seat comes into mechanical interaction with the at least one weight-responsive sensor, and is configured to change a status of the at least one weight-responsive sensor if a mechanical load at least corresponding to a second pre-determined threshold value is applied. Relative movement between the seat base and the at least one weight-responsive sensor is at least excluded for applied mechanical loads that are smaller than the first pre-determined threshold value.

14 Claims, 4 Drawing Sheets

(51) Int. Cl.
    *G01G 19/414*     (2006.01)
    *G01G 21/28*     (2006.01)
    *B60R 22/48*     (2006.01)

(52) U.S. Cl.
    CPC ......... *G01G 19/4142* (2013.01); *G01G 21/28* (2013.01); *B60R 22/48* (2013.01); *B60R 2022/4858* (2013.01)

(56) References Cited

U.S. PATENT DOCUMENTS

| | | | |
|---|---|---|---|
| 6,662,138 B1 | 12/2003 | Takafuji et al. | |
| 7,574,018 B2 * | 8/2009 | Luo | G06K 9/00369 382/103 |
| 7,762,582 B2 * | 7/2010 | Breed | B60N 2/002 180/274 |
| 2002/0011722 A1 * | 1/2002 | Winkler | G06K 9/00362 280/735 |
| 2005/0090958 A1 | 4/2005 | Hattori et al. | |
| 2007/0083311 A1 * | 4/2007 | Tabe | B60R 21/0132 701/45 |
| 2009/0107258 A1 | 4/2009 | Saitoh et al. | |

OTHER PUBLICATIONS

Written Opinion for International application No. PCT/EP2016/053758, dated May 19, 2016, 6 pages.

\* cited by examiner

WEIGHT-RESPONSIVE VEHICLE SEAT OCCUPANT DETECTION AND CLASSIFICATION METHOD AND SYSTEM

TECHNICAL FIELD

The invention relates to a weight-responsive vehicle seat occupant detection and classification system, a method for detecting and classifying a vehicle seat occupancy using such vehicle seat occupant detection and classification system and a software module for carrying out the method.

BACKGROUND ART

Vehicle seat occupancy detection systems are nowadays widely used in vehicles, in particular in passenger cars, for providing a seat occupancy signal for various appliances, for instance for the purpose of a seat belt reminder (SBR) system or an activation control for an auxiliary restraint system (ARS). Seat occupancy detection systems include seat occupancy sensors that are known to exist in a number of variants, e.g. based on capacitive sensing, on deformation sensing or on sensing of pressure/force. In order to meet requirements regarding easy integration and required robustness, weight-sensitive seat occupancy sensors have typically been arranged on the B-surface of a vehicle seat, i.e. between a foam body of a seat cushion and a seat pan or cushion-supporting springs of the vehicle seat.

Further, vehicle seat occupancy detection systems are known to be employed as a means of assessing a potential activation of an installed vehicle passenger restraint system, such as an airbag.

For example, U.S. Pat. No. 5,987,370 describes an apparatus for estimating the weight of an occupant of a seat in a motor vehicle. The apparatus includes a closed elastomeric bladder filled with fluid being installed in the foam cushion of a vehicle seat bottom. The apparatus includes at least one pressure sensor installed in a closed exit port of the bladder. A temperature sensor disposed in proximity to the bladder provides a temperature signal, and a controller estimates the weight of the occupant based on the temperature and pressure signals. The pressure sensor is configured to sense a differential pressure between the fluid and atmospheric pressure at the center of gravity of the fluid in order to provide a stable output independent of changing atmospheric pressure and changing orientation of the bladder due to vehicle pitch and roll. The estimated weight is used as the criteria to distinguish between an adult, an infant or small child.

SUMMARY

It is desirable to provide a vehicle seat occupant detection and classification system with an improved performance and range with regard to classifying vehicle seat occupants, including infant seats, for instance for the purpose of enabling or disabling installed auxiliary vehicle passenger restraint systems, such as airbags, and/or enabling or disabling a seat belt reminder (SBR) signal.

It is therefore an object of the invention to provide a vehicle seat occupant detection and classification system that is capable of reliably and reproducibly detecting a seat occupancy and/or of at least distinguishing a child from an adult occupant.

In one aspect of the present invention, this object is achieved by a vehicle seat occupant detection and classification system for use in a vehicle seat which includes a seat base configured for taking up a seat cushion having at least one seat foam member, and wherein the seat base and the seat cushion are provided for supporting a bottom of a seat occupant. The vehicle seat occupant detection and classification system comprises at least one weight-responsive sensor, and at least one bracket member, serving as a holder for the at least one weight-responsive sensor, wherein in an operational state, the at least one weight-responsive sensor is arranged between the at least one seat foam member and the at least one bracket member.

The at least one bracket member is fixedly attached to a portion of the seat base at a location below the at least one seat foam member such that a portion of the vehicle seat is configured to come into mechanical interaction with the at least one weight-responsive sensor if a mechanical load corresponding to at least a first pre-determined threshold value is applied by a seat occupant to and being directed towards the at least one weight-responsive sensor. The at least one bracket member is further configured to change a status of the at least one weight-responsive sensor if a mechanical load corresponding to at least a second pre-determined threshold value is applied by the seat occupant, wherein the second pre-determined threshold value is larger than the first pre-determined threshold value.

The term "vehicle", as used in this application, shall particularly be understood to encompass passenger cars, trucks and buses.

The seat occupant classification system may comprise, but is not limited to, classes selected out of a group formed by "empty", "child", "child seat" and "adult".

The expression "mechanical interaction" between two objects, as used in this application, shall in particular be understood such that one of the two objects applies a mechanical force directly, via physical contact, or indirectly, via a third object, to the other one of the two objects.

A relative movement between the portion of the seat base to which the at least one bracket member is attached and the at least one weight-responsive sensor is at least excluded for applied mechanical loads that are smaller than the mechanical load corresponding to the first threshold value.

The expressions "above", "higher", "below", and "lower", as used in this application, shall in particularly be understood with regard to a direction that is arranged perpendicular to the passenger cabin floor, wherein "above" and "higher" is meant to be further away from the passenger cabin floor, and "below" and "lower" is meant to be closer to the passenger cabin floor.

An advantage of the disclosed vehicle seat occupant detection and classification system lies in that any seat cushion movement generated by applying a mechanical load to the vehicle seat cushion can be detected and used for seat occupancy classifying against a fixed reference level formed by the seat base and the at least one bracket member, enabling a precise and reproducible detection of the applied mechanical load being equivalent to the second pre-determined threshold value.

The system preferably further comprises an evaluation unit that is configured to evaluate a status of the at least one weight-responsive sensor for generating an output signal that is based on a result of the evaluation and that is indicative of at least one out of a seat occupancy status and a seat occupancy class.

The classification provided by the vehicle seat occupant detection and classification system can advantageously support the decision of enabling or disabling passenger restraint systems that are installed in the vehicle. In this way, the vehicle seat occupant detection and classification system can contribute in complying with requirements from vehicle safety regulations, such as FMVSS (Federal Motor Vehicle Safety Standard) No. 208 concerning occupant crash protection.

The evaluation unit may be configured to evaluate the status continuously or at specified intervals, periodically or event-triggered.

The output signal may be an electric signal, an electromagnetic signal or any other type of signal that appears to be suitable to those skilled in the art.

Further, in a suitable embodiment, the seat cushion movement can be detected substantially independent of a vehicle cabin temperature.

In one embodiment, the second pre-determined threshold value of the mechanical load may substantially be equal to the first pre-determined threshold value of mechanical load.

In a preferred embodiment of the vehicle seat occupant detection and classification system, the at least one bracket member comprises at least two bracket portions substantially shaped as rectangular plates. The bracket member is fixedly attached to the seat base by a first plate of the at least two rectangular plates, the at least one weight-responsive sensor is held by a second plate of the at least two rectangular plates, and the at least two rectangular plates are mutually fixedly attached in a pairwise manner.

The expression "fixedly attached", as used in this application, shall particularly be understood to encompass the use of material bonding by applying methods such as welding, brazing or gluing as well as the use of force closure connections by, for instance, riveting or employing screw joints.

In this way, the at least one bracket member can be designed simply and can readily be provided in a cost-saving way. Further, at least one bracket part of the at least two bracket parts can include one or more bends about a direction arranged in parallel to a shorter side of the rectangle, so as to hold the at least one weight-responsive sensor in a height position that is different from a height position of the location of attachment of the at least one bracket member to the seat base, allowing for more design freedom.

Preferably, the at least one weight-responsive sensor is selected from, but not limited to, a group formed by a resistive pressure sensor, a micro-switch or a membrane switch. By that, a high degree of freedom for designing the vehicle seat occupant detection and classification system can be achieved.

In another preferred embodiment, the vehicle seat occupant detection and classification system comprises a plurality of weight-responsive sensors and a plurality of bracket members, wherein each bracket member serves as a holder for at least one weight-responsive sensor of the plurality of weight-responsive sensors.

In this way, besides providing redundancy for seat occupancy detection, the statuses of the plurality of weight-responsive sensors can be evaluated in a combined way, and conclusions based on positions of different portions of the vehicle seat and the statuses of the weight-responsive sensors the corresponding portion of the vehicle seat is configured to come into mechanical interaction with if a mechanical load is applied by a seat occupant, can be facilitated.

In yet another embodiment of the vehicle seat occupant detection and classification system, the at least one bracket member or at least one bracket member of the plurality of bracket members is resiliently deflectable in the direction of the mechanical load that is applied towards at least one of the weight-responsive sensors which the bracket member is holding, by a distance of at least 5 mm at a location that is distal to the location of attachment of the bracket member to the seat base, if a mechanical load corresponding to the second threshold value is applied.

In this way, the difference between the first deflection of the portion of the vehicle seat that is configured to come into mechanical interaction with the at least one weight-responsive sensor at an applied mechanical load corresponding to the first pre-determined threshold value, and a second deflection of the portion of the vehicle seat at an applied mechanical load corresponding to the second pre-determined threshold value can be increased. Thereby, a seating comfort for the seat occupant can be enhanced, as the at least one weight-responsive sensor is a lesser obstacle for further deflection of the portion of the vehicle seat once it has come into mechanical interaction with the at least one weight-responsive sensor. Further, the increased difference between the first deflection and the second deflection can be exploited for a higher precision in defining the change of the status of the at least one weight-responsive sensor by the portion of the vehicle seat if a mechanical load corresponding to the second pre-determined threshold value is applied.

In another preferred embodiment, the evaluation unit is configured to evaluate the statuses of the plurality of weight-responsive sensors for generating the output signal by forming at least one logical combination of at least a subset of the statuses of the plurality of sensors. In this way, similar seat occupant classes can effectively and reliably be determined that are known to comprise at least one characteristic and distinguishing deflection of a specific portion of the vehicle seat by positioning at least one weight-responsive sensor of the plurality of weight-responsive sensors for coming into mechanical interaction with that specific portion of the vehicle seat.

In yet another preferred embodiment, the evaluation unit is configured to evaluate the statuses of the plurality of weight-responsive sensors by matching the statuses to a plurality of pre-determined patterns of statuses of the plurality of weight-responsive sensors. Each of the pre-determined pattern of statuses can be assigned to a specific seat occupancy class, so that, if the evaluation unit finds a match of the statuses of the plurality of weight-responsive sensors to one of the pre-determined patterns of statuses, the evaluation unit is configured to generate an output signal that is indicative of the specific seat occupancy class.

It is another object of the invention to provide a method for detecting and classifying an occupancy of a vehicle seat. The method comprises steps of provinding an embodiment of the vehicle seat occupant detection and classification system as disclosed herein, fixedly attaching the at least one bracket member with the at least one weight-responsive sensor to the seat base at a location below the at least one seat foam member, evaluating a status of the at least one weight-responsive sensor, and based on a result of the step of evaluating, generating an output signal that is indicative of at least one out of a seat occupancy status and a seat occupancy class. The advantages presented before regarding the vehicle seat occupant detection and classification system apply as well to the method in accordance with the invention.

The steps of evaluating the status and generating the output signal may be carried out continuously or at specified intervals, periodically, event-triggered and/or triggered by a vehicle control unit (VCU).

In a preferred embodiment of the method, the step of evaluating comprises forming at least one logical combination of at least a subset of the statuses of the plurality of weight-responsive sensors.

In one embodiment of the method, the step of evaluating comprises matching the statuses of the plurality of weight-responsive sensors to a plurality of pre-determined patterns of statuses of the plurality of weight-responsive sensors.

In yet another aspect of the invention, a vehicle seat is provided. The vehicle seat comprises a seat structure for erecting the vehicle seat on a passenger cabin floor of the vehicle, a seat cushion having at least one seat foam member, a seat base supported by the seat structure and configured for receiving the seat cushion, wherein the seat base and the seat cushion are provided for supporting a bottom of a seat occupant, and an embodiment of the vehicle seat occupant detection and classification system as disclosed herein. In this way, a vehicle seat can be provided that includes a vehicle seat occupant detection and classification system that is able to detect and classify a seat occupancy in a precise and reproducible way.

Preferably, the seat base of the vehicle seat comprises a base frame and plurality of suspension springs, which are connected to the base frame.

In yet another aspect of the invention, a software module for controlling an execution of steps of an embodiment of the method disclosed herein is provided.

The method steps to be conducted are converted into a program code of the software module, wherein the program code is implementable in a digital memory unit of the evaluation unit or a separate vehicle control unit and is executable by a processor unit of the evaluation unit or the separate vehicle control unit.

The software module can enable a robust and reliable execution of the method and can allow for a fast modification of method steps.

These and other aspects of the invention will be apparent from and elucidated with reference to the embodiments described hereinafter.

BRIEF DESCRIPTION OF THE DRAWINGS

Preferred embodiments of the invention will now be described, by way of example, with reference to the accompanying drawings, in which.

DESCRIPTION OF PREFERRED EMBODIMENTS

Figure 1:
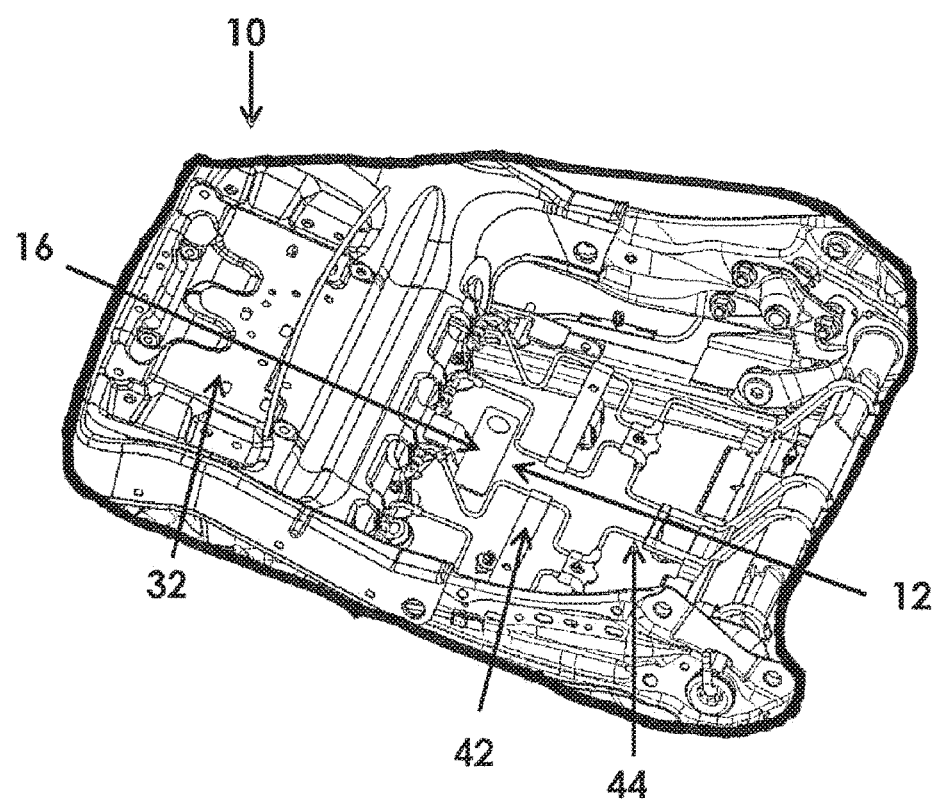
FIG. 1 is a perspective partial view from above on a vehicle seat with an installed vehicle seat occupant detection and classification system in accordance with an embodiment of the invention.

FIG. 1 is a perspective partial view from above on a vehicle seat 10, in particular a passenger car seat, with an installed vehicle seat occupant detection and classification system 12 in accordance with an embodiment of the invention.

Figure 2:
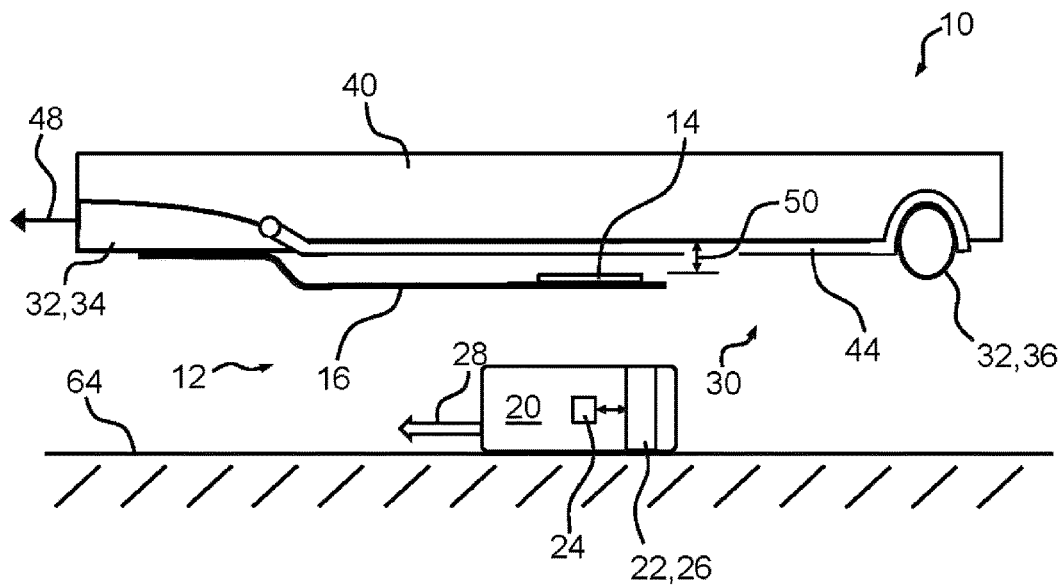
FIG. 2 schematically illustrates a partial cross-sectional side view of the vehicle seat occupant detection and classification system pursuant to FIG. 1 in an unloaded condition.
Figure 4:
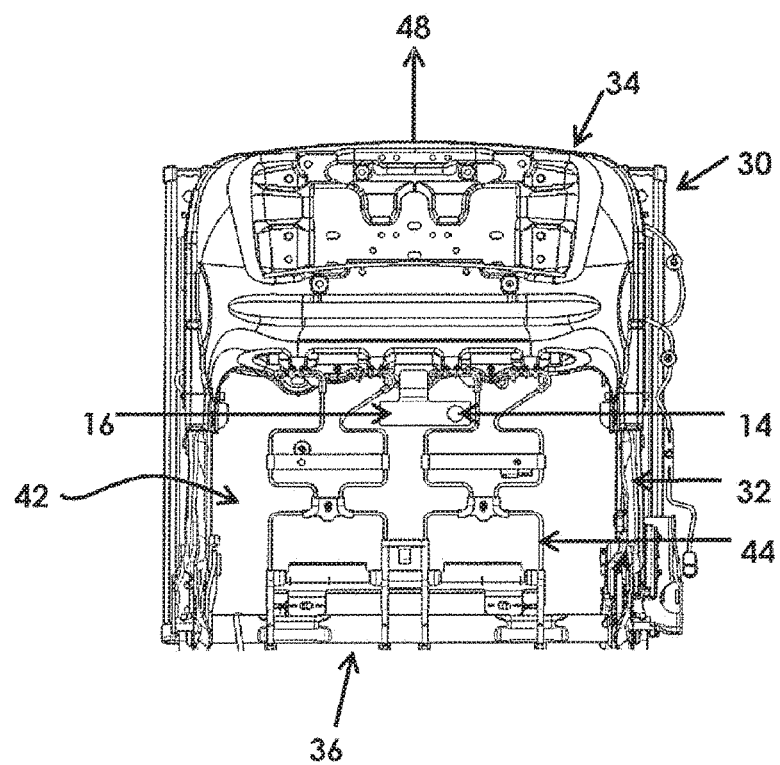
FIG. 4 is a schematic top view of the vehicle seat pursuant to FIG. 1.

FIG. 2 schematically illustrates a partial cross-sectional side view of the vehicle seat 10 pursuant to FIG. 1. The vehicle seat 10 comprises a seat structure (not shown) by which it is erected on a passenger cabin floor 64, as is well known in the art. The vehicle seat further comprises a backrest (not shown) and a seat base 30. The seat base 30 is supported by the seat structure and configured for receiving the seat cushion. The seat base 30 and the seat cushion are provided for supporting a bottom of a seat occupant 62. The seat base 30 includes a base frame 32 substantially made of steel, and a suspension mat 42 with a plurality of steel suspension springs 44 connected to opposing edges of the base frame 32, as can best be seen in FIG. 4, wherein the seat foam member 40 is not shown for the purpose of clarity. The suspension mat 42 is deflected downwards if a mechanical load is applied on the seat cushion by the seat occupant 62. Points of fixation of the suspension springs 44 at the base frame 32, by definition, do not undergo any displacement, whereas a displacement of the seat cushion B-surface, which in an operational state is directed towards the suspension mat 42, represents in general a non-uniform, two-dimensional deflection field.

The deflection of the suspension mat 42 is depending on the type of mechanical load applied to the seat cushion, for instance a mechanical load applied by a human seat occupant, or a mechanical load applied by a lifeless object. A magnitude of the deflection of the suspension mat 42 is determined by spring rates, geometry, material, design, base frame fixation, number of springs, spring connectors, and others.

Referring back to FIG. 2, the seat cushion comprises a seat foam member 40 for providing comfort to the seat occupant 62. The seat foam member 40 includes a top surface and a bottom surface (the B-surface). The seat base 30 has a top surface for receiving the seat cushion such that the B-surface of the seat cushion is in mechanical contact with the seat base top surface. A rear edge 36 of the seat base 30 is proximal to the backrest, and a front edge 34 of the seat base 30, which is provided to support a lower thigh region of an adult seat occupant, is distal to the backrest. A seating direction 48 shall be defined by a direction pointing from the front edge 34 of the seat base 30, and being arranged perpendicularly to the front edge 34 and horizontally to the passenger cabin floor 64.

The vehicle seat occupant detection and classification system 12 includes a weight-responsive sensor 14 and a bracket member 16 serving as a holder for the weight-responsive sensor 14. The weight-responsive sensor 14 is designed as a membrane switch.

Figure 5:
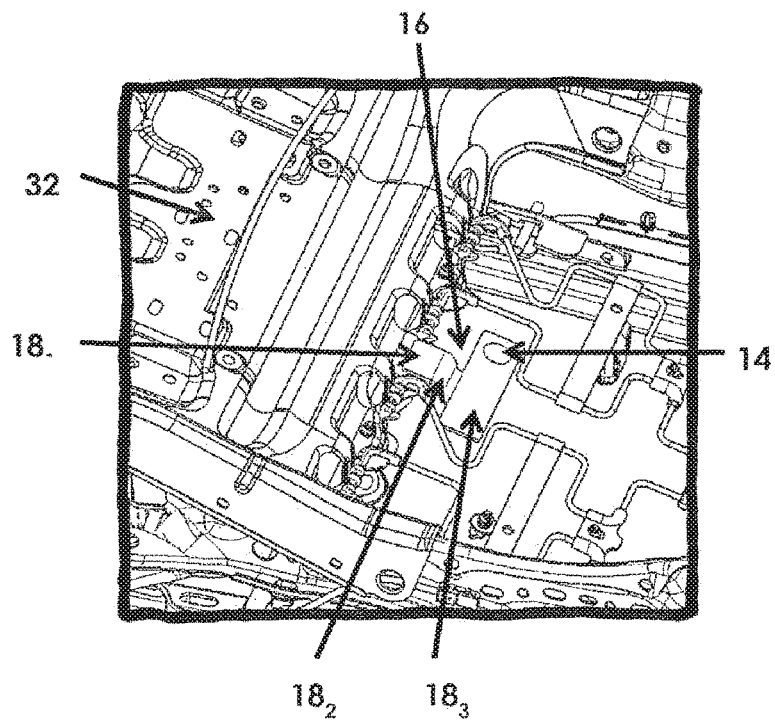
FIG. 5 is a perspective top view of the bracket member of the vehicle seat occupant detection and classification system pursuant to FIGS. 1 to 4.

As can best be seen in FIG. 5 in a perspective top view, the bracket member 16 comprises three bracket portions $18_1$, $18_2$, $18_3$ that are designed integrally and are shaped as rectangular plates, each rectangular plate having two end regions close to the short edges of the rectangular plate. A first bracket portion $18_1$ and a third bracket portion $18_3$ of the three bracket portions $18_1$, $18_2$, $18_3$ are kept flat, whereas the second bracket portion $18_2$ includes two bends about a direction arranged in parallel to the shorter side of the rectangle. The first bracket portion $18_1$ is fixedly attached with one of its end regions to the base frame 32 by a bolted connection, and the other end region abuts one of the end regions of the second bracket portion $18_2$. The other end region of the second bracket portion $18_2$, in turn, abuts a side region of the third bracket portion $18_3$, which is arranged at a 90° angle to the first bracket portion $18_1$. The weight-responsive sensor 14 is attached to a top side of the other end region of the third bracket portion $18_3$ by an adhesive bond. The bracket member 16 may, for instance, be produced by punching from a metal sheet and subsequent bending of the second bracket portion $18_2$.

In the operational state of the vehicle seat occupant detection and classification system 12, as shown in FIG. 5, the weight-responsive sensor 14 is disposed, with regard to a direction perpendicular to the passenger cabin floor 64, between the B-surface of the seat foam member 40 and the bracket member 16. As is shown most clearly in FIG. 4, which is a schematic top view of the vehicle seat 10 with removed seat foam member 40, the third bracket portion $18_3$ that holds the weight-responsive sensor 14 is arranged in the gap of a turn of one of the meandering suspension springs 44 so as to avoid mechanical contact with the suspension mat 42.

The bracket member 16 is fixedly attached to the seat base 30 at a location below the seat foam member 40 that is close to the front edge 34 of the seat base 30. The specific portion of the seat foam member 40 that is disposed close to the front edge 34 of the seat base 30 is configured to come into mechanical interaction with the weight-responsive sensor 14 if a mechanical load corresponding to a first pre-determined threshold value is applied by the seat occupant 62 to a front region of the seat cushion and is directed towards the weight-responsive sensor 14.

FIG. 2 shows the vehicle seat occupant detection and classification system 12 being installed in the vehicle seat 10 and in an unloaded condition. As can be seen best in FIG. 2, a relative movement between the base frame 32 and the weight-responsive sensor 14 is at least excluded for applied mechanical loads that are smaller than the first pre-determined threshold value. It is only when the applied mechanical load at least corresponds to the first pre-determined threshold value that a portion of the seat foam member 40 located above the weight-responsive sensor 14 comes into mechanical interaction with the weight-responsive sensor 14.

Figure 3:
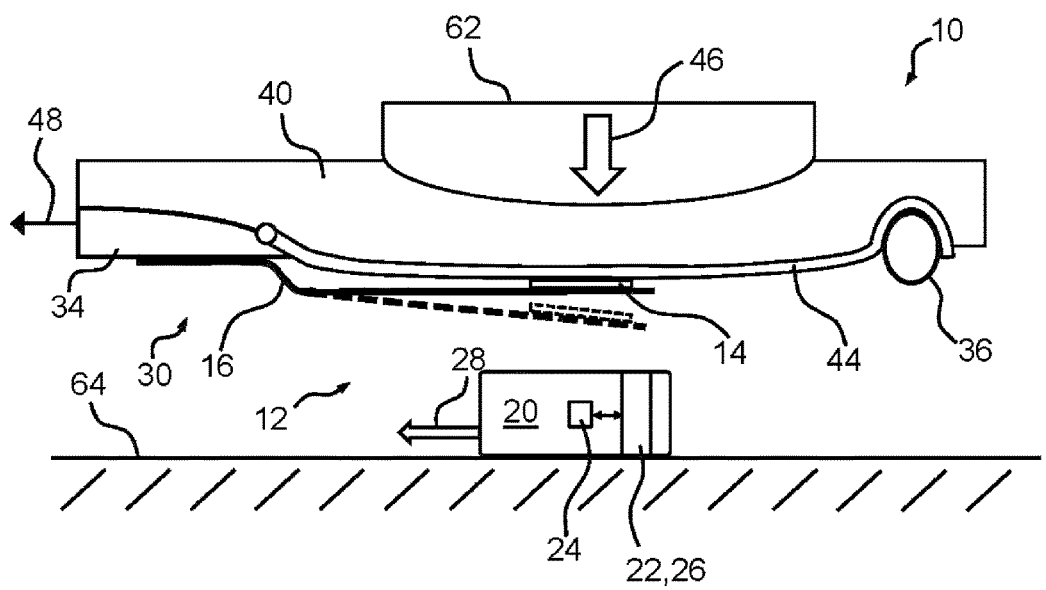
FIG. 3 shows the vehicle seat occupant detection and classification system installed in the vehicle seat pursuant to FIG. 1, in a condition of a mechanical load applied by a seat occupant.

If the applied mechanical load corresponds at least to a second pre-determined threshold value, which is larger than the first pre-determined threshold value, the specific portion of the seat foam member 40 that is disposed above the weight-responsive sensor 14 is configured to change a switching status of the weight-responsive sensor 14. This condition is illustrated in FIG. 3, wherein the weight-responsive sensor 14 is drawn in a solid line.

If the bracket member 16 was assumed to be made from an infinity rigid material, a difference between a first deflection 50 of the portion of the seat foam member 40 that is configured to come into mechanical interaction with the weight-responsive sensor 14 at an applied mechanical load corresponding to the first pre-determined threshold value, and a second deflection of the portion of the seat foam member 40 at an applied mechanical load corresponding to the second pre-determined threshold value, is equal to a travel of the membrane switch required for changing between an open status and a switched status of the membrane switch.

In an alternative material choice, the bracket member 16 is made from spring steel, and is thus resiliently deflectable in the direction of the mechanical load that is applied towards the weight-responsive sensor 14 held by the bracket member 16, by a distance of 10 mm at a location that is distal to the location of attachment of the bracket member 16 to the base frame 32, if a mechanical load corresponding to the second threshold value is applied. This condition is illustrated in FIG. 3 by the weight-responsive sensor 14 being drawn in a dashed line.

Referring again to FIGS. 2 and 3, the vehicle seat occupant detection and classification system 12 further includes an evaluation unit 20 that is arranged in a position close to the vehicle seat 10. The evaluation unit 20 is configured to evaluate the status of the weight-responsive sensor 14 for generating an output signal 28 that is based on a result of the evaluation and that is indicative of a seat occupancy status. To this end, a cable connection (not shown in FIG. 2) is installed between the evaluation unit 20 and the weight-responsive sensor 14.

Initiated by a vehicle control unit after starting the vehicle, the evaluation unit 20 is configured to evaluate the status of the weight-responsive sensor 14 periodically and autonomously. To this end, the evaluation unit 20 comprises a software module 26 that is implemented in a digital memory unit 22 of the evaluation unit 20 and that is accessible and executable by a processor unit 24 of the evaluation unit 20. Method steps of evaluating a status of the weight-responsive sensor 14 and of, based on a result of the step of evaluating, generating the output signal 28 that is indicative of the seat occupancy status are converted into a program code of the software module 26. The output signal 28 generated by the evaluation unit 20 is provided to the vehicle control unit via a CAN communication link, as is well known in the art.

Figure 6:
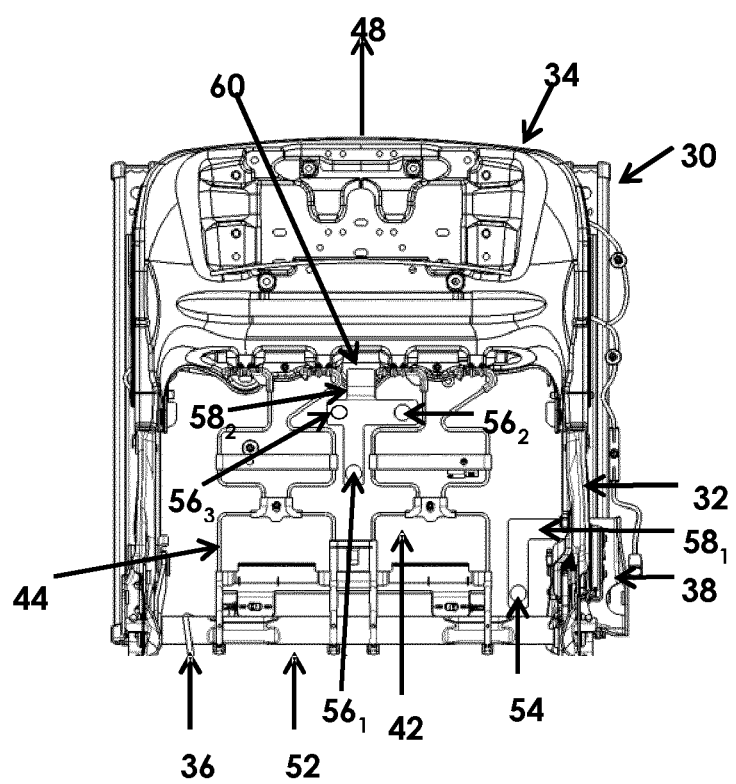
FIG. 6 is a schematic top view of the vehicle seat pursuant to FIG. 1 with an installed alternative embodiment of a vehicle seat occupant detection and classification system in accordance with the invention.

A schematic top view of the vehicle seat 10 with an installed alternative embodiment of the vehicle seat occupant detection and classification system 52 is shown in FIG. 6. Only differences with regard to the former embodiment will be described in the following.

The alternative embodiment of the vehicle seat occupant detection and classification system 52 comprises a plurality of two bracket members $58_1$, $58_2$ and a plurality of four weight-responsive sensors 54, $56_1$, $56_2$, $56_3$ that are designed as membrane switches. The first bracket member $58_1$ serves as a holder for one weight-responsive sensor 54 and is identically designed to the bracket member 16 of the former embodiment. The additional second bracket member $58_2$ serves as a holder for three weight-responsive sensors $56_1$, $56_2$, $56_3$ and comprises four bracket portions 60, each of which is of rectangular shape as described for the earlier embodiment.

The first bracket member $58_1$ is fixedly attached by an adhesive bond to a side edge 38 of the base frame 32. The second bracket member $58_2$ is fixedly attached by an adhesive bond to the front edge 34 of the base frame 32. Both the first bracket member $58_1$ and the second bracket member $58_2$ are arranged in gaps of turns of one of the meandering suspension springs 44 so as to avoid mechanical contact with the suspension mat 42.

The evaluation unit 20 is configured to periodically evaluate statuses of the four weight-responsive sensors 54, $56_1$, $56_2$, $56_3$ for generating an output signal 28 that is indicative of a seat occupancy class by forming logical combinations of the statuses of the plurality of weight-responsive sensors 54, $56_1$, $56_2$, $56_3$. By way of example, one of the logical combinations is given by the status of the weight-responsive sensor 54 on the first bracket member $58_1$ being equivalent to "loaded" and all of the statuses of the three weight-responsive sensors $56_1$, $56_2$, $56_3$ on the second bracket member $58_2$ being "unloaded". In this case, the evaluation unit 20 is configured to generate an output signal 28 that is indicative of the seat occupancy class "lifeless object", and more specifically, for instance a child seat.

Another example of one of the logical combinations is given by the status of the weight-responsive sensor 54 on the first bracket member $58_1$ being equivalent to "loaded" and at least two of the statuses of the three weight-responsive sensors $56_1$, $56_2$, $56_3$ on the second bracket member $58_2$ being "loaded". In this case, the evaluation unit 20 is configured to generate an output signal 28 that is indicative of the seat occupancy class "adult".

Further logical combinations are contemplated, making use of the fact that human seat occupants and lifeless objects create different spatial deflections of the seat foam member 40, an insight which can be exploited for characterizing seat occupancy classes by logical combinations of the statuses of weight-responsive sensors at their locations of attachment to the base frame 32.

The evaluation unit 20 may alternatively or additionally be configured to evaluate the statuses of the plurality of four weight-responsive sensors 54, $56_1$, $56_2$, $56_3$ by matching the statuses to a plurality of pre-determined patterns of statuses of the plurality of four weight-responsive sensors 54, $56_1$, $56_2$, $56_3$. Each of the pre-determined patterns comprises information on the status, in this particular embodiment a switching status, of each of the four weight-responsive sensors 54, $56_1$, $56_2$, $56_3$. The plurality of pre-determined patterns of statuses may be stored in the digital memory unit 22 of the evaluation unit 20. The plurality of pre-determined patterns of statuses may reflect observations on the spatial deflection of the seat foam member 40 by human seat occupants in various seating postures and/or by various lifeless objects.

While embodiments of the invention have been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

The invention claimed is:

1. A vehicle seat occupant detection and classification system for use in a vehicle seat, said vehicle seat including a seat base configured to receive a seat cushion having at least one seat foam member, the seat base and the seat cushion being provided for supporting a bottom of a seat occupant, the vehicle seat occupant detection and classification system comprising at least one weight-responsive sensor, and
at least one bracket member, serving as a holder for the at least one weight-responsive sensor, wherein in an operational state, the at least one weight-responsive sensor is arranged between the at least one seat foam member and the at least one bracket member,
wherein the at least one bracket member is fixedly attached to a portion of the seat base at a location below the at least one seat foam member such that a portion of the vehicle seat is configured to come into mechanical interaction with the at least one weight-responsive sensor when a mechanical load corresponding to at least a first pre-determined threshold value is applied by the seat occupant to and being directed towards the at least one weight-responsive sensor, and is configured to change a status of the at least one weight-responsive sensor when a mechanical load corresponding to at least a second pre-determined threshold value is applied,
wherein a relative movement between the portion of the seat base to which the at least one bracket member is attached and the at least one weight-responsive sensor is at least excluded for applied mechanical loads that are smaller than the first pre-determined threshold value, and
wherein the at least one bracket member is resiliently deflectable in the direction of the mechanical load that is applied towards at least one of the weight-responsive sensors held by the bracket member when a mechanical load corresponding to the second threshold value is applied.

2. The vehicle seat occupant detection and classification system as claimed in claim 1, further comprising an evaluation unit that is configured to evaluate a status of the at least one weight-responsive sensor and to generate an output signal that is based on a result of the evaluation and that is indicative of at least one out of a seat occupancy status and a seat occupancy class.

3. The vehicle seat occupant detection and classification system as claimed in claim 1, wherein the at least one bracket member comprises at least two bracket portions shaped as rectangular plates, wherein the at least one bracket member is fixedly attached to the seat base by a first plate of the at least two rectangular plates, the at least one weight-responsive sensor is held by a second plate of the at least two rectangular plates, and the at least two rectangular plates are mutually fixedly attached in a pairwise manner.

4. The vehicle seat occupant detection and classification system as claimed in claim 1, wherein the at least one weight-responsive sensor is selected from a group formed by a resistive pressure sensor, a micro-switch or a membrane switch.

5. The vehicle seat occupant detection and classification system as claimed in claim 1, comprising a plurality of weight-responsive sensors and a plurality of bracket members, wherein each bracket member serves as a holder for at least one weight-responsive sensor of the plurality of weight-responsive sensors.

6. The vehicle seat occupant detection and classification system as claimed in claim 5, wherein the evaluation unit is configured to evaluate the statuses of the plurality of weight-responsive sensors for generating the output signal by forming at least one logical combination of at least a subset of the statuses of the plurality of weight-responsive sensors.

7. The vehicle seat occupant detection and classification system as claimed in claim 5, wherein the evaluation unit is configured to evaluate the statuses of the plurality of weight-responsive sensors by matching the statuses to a plurality of pre-determined patterns of statuses of the plurality of weight-responsive sensors.

8. The vehicle seat occupant detection and classification system as claimed in claim 1, wherein the at least one bracket member is resiliently deflectable in the direction of the mechanical load by a distance of at least 5 mm at a location that is distal to the location of attachment of the at least one bracket member to the seat base, when the mechanical load corresponding to the second threshold value is applied.

9. A method of detecting and classifying an occupancy of a vehicle seat, the method comprising steps of:
  providing a vehicle seat occupant detection and classification system according to claim 1,
  fixedly attaching the at least one bracket member with the at least one weight-responsive sensor to the seat base at a location below the at least one seat foam member,
  evaluating a status of the at least one weight-responsive sensor, and
  based on a result of the step of evaluating, generating an output signal that is indicative of at least one out of a seat occupancy status and a seat occupancy class.

10. The method of detecting and classifying an occupancy of a vehicle seat as claimed in claim 9, wherein the step of evaluating comprises forming at least one logical combination of at least a subset of the statuses of the plurality of weight-responsive sensors.

11. The method of detecting and classifying an occupancy of a vehicle seat as claimed in claim 9, wherein the step of evaluating comprises matching the statuses of the plurality of weight-responsive sensors to a plurality of pre-determined patterns of statuses of the plurality of weight-responsive sensors.

12. A non-transitory digital memory unit for carrying out the method of classifying an occupancy of a vehicle seat as claimed in claim 9, wherein the method steps to be conducted are stored on the digital memory unit as program code that is implementable in the evaluation unit or a separate vehicle control unit and is executable by a processor unit of the evaluation unit or the separate vehicle control unit.

13. A vehicle seat, comprising
  a seat structure for erecting the vehicle seat on a passenger cabin floor of the vehicle,
  a seat cushion having at least one seat foam member,
  a seat base supported by the seat structure and configured for receiving the seat cushion, the seat base and the seat cushion being provided for supporting a bottom of a seat occupant, and
  a vehicle seat occupant detection and classification system as claimed in claim 1.

14. The vehicle seat as claimed in claim 13, wherein the seat base comprises a base frame and a plurality of suspension springs connected to the base frame.

\* \* \* \* \*